United States Patent [19]

Kinkopf et al.

[11] 4,446,813
[45] May 8, 1984

[54] MOULD HANDLING, CLEANING AND PREPARATION SYSTEMS

[75] Inventors: Edward J. Kinkopf; Karl L. Polen, both of Alliance, Ohio

[73] Assignee: The Alliance Machine Company, Alliance, Ohio

[21] Appl. No.: 476,123

[22] Filed: Mar. 17, 1983

[51] Int. Cl.³ .......................... B05C 5/00; B05C 7/02; B05C 13/02
[52] U.S. Cl. ..................................... 118/72; 118/317; 118/503; 15/104.1 C
[58] Field of Search ................. 118/72, 317, 503, 323; 15/104.1 C, 91; 164/158, 267; 427/135

[56] References Cited

U.S. PATENT DOCUMENTS

| | | | |
|---|---|---|---|
| 801,646 | 10/1905 | Carlsson | 164/267 |
| 1,982,763 | 12/1934 | Russell et al. | 118/317 X |
| 3,175,239 | 3/1965 | Casperson | 15/104.1 C |
| 3,472,201 | 10/1969 | Quackenbush | 118/317 X |
| 4,110,863 | 9/1978 | Fujimori et al. | 15/104.1 C |

FOREIGN PATENT DOCUMENTS 48-40539 12/1973 Japan .............................. 15/104.1 C Primary Examiner—John P. McIntosh
Attorney, Agent, or Firm—Buell, Blenko, Ziesenheim & Beck

[57] ABSTRACT

A mould handling, cleaning and preparation apparatus is provided having a bridge movable over a work area, a trolley running lengthwise of the bridge and carrying suspended therefrom a vertical guide frame with an inner telescoping lift column carry tongs at the lower end, a secondary guide frame with a vertically movable cleaning column and rotatable cleaning head is mounted on one side of the main guide frame and a spray head guide rail and vertically moving spray head are mounted on the opposite side of the guide frame.

5 Claims, 10 Drawing Figures

Fig. 4.
Fig. 5.
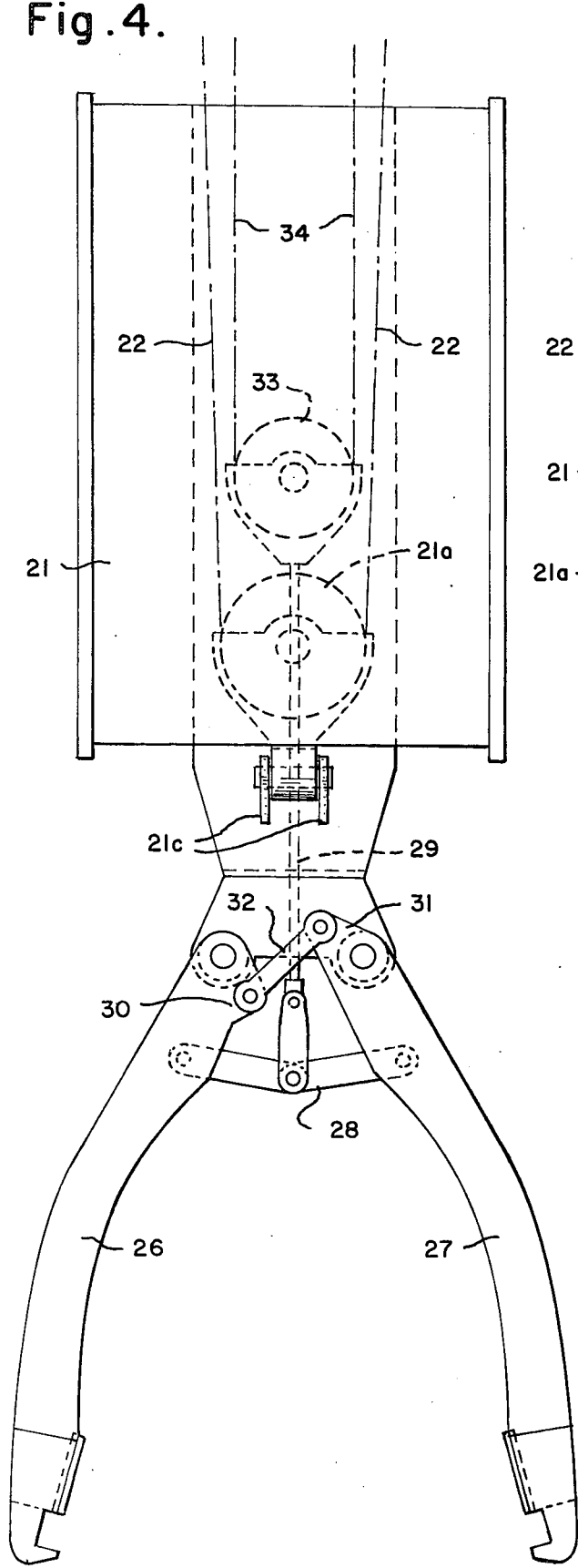
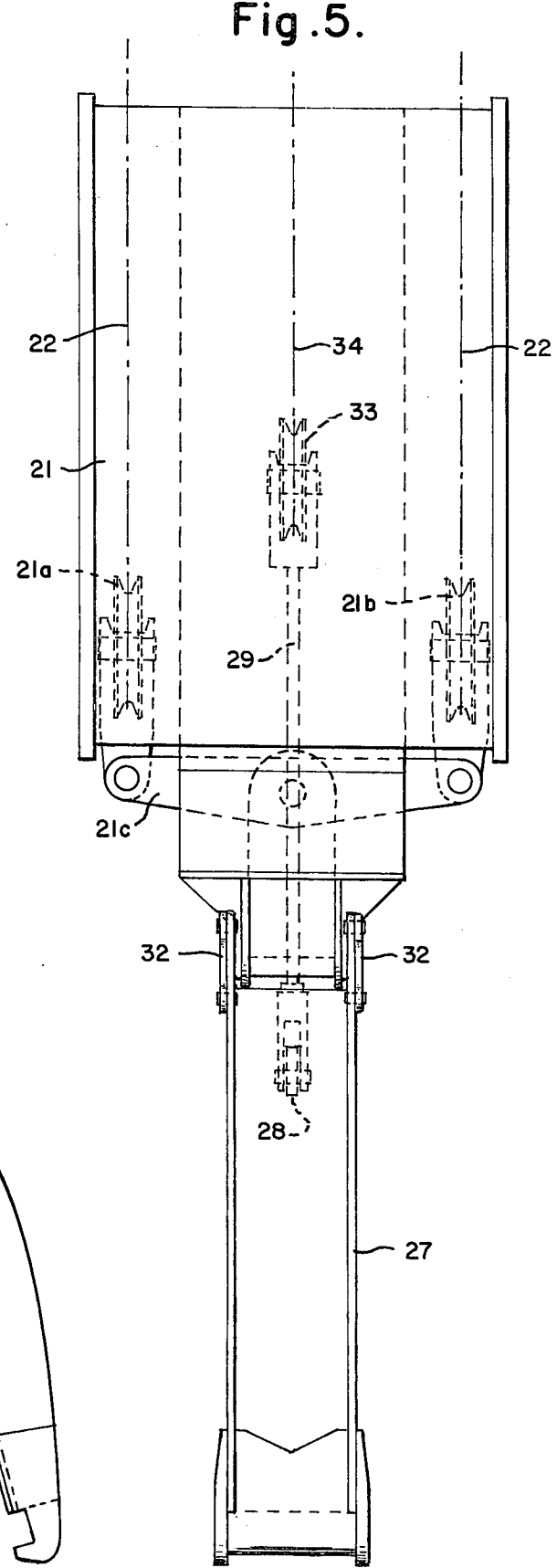

Fig. 7.
Fig. 8.
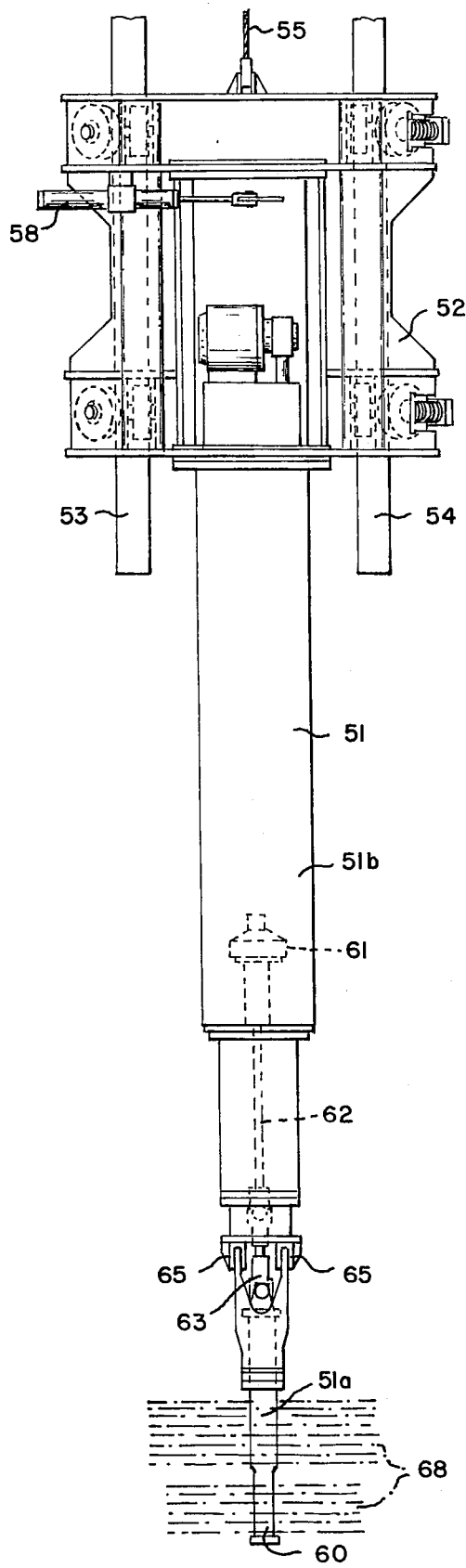
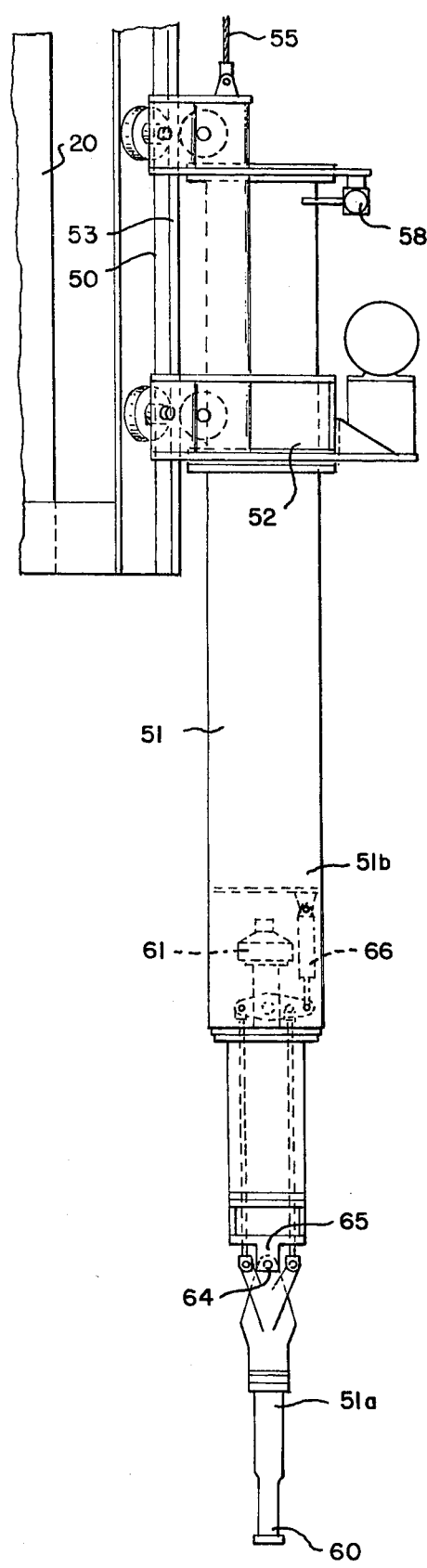

Fig. 9.
Fig. 10.
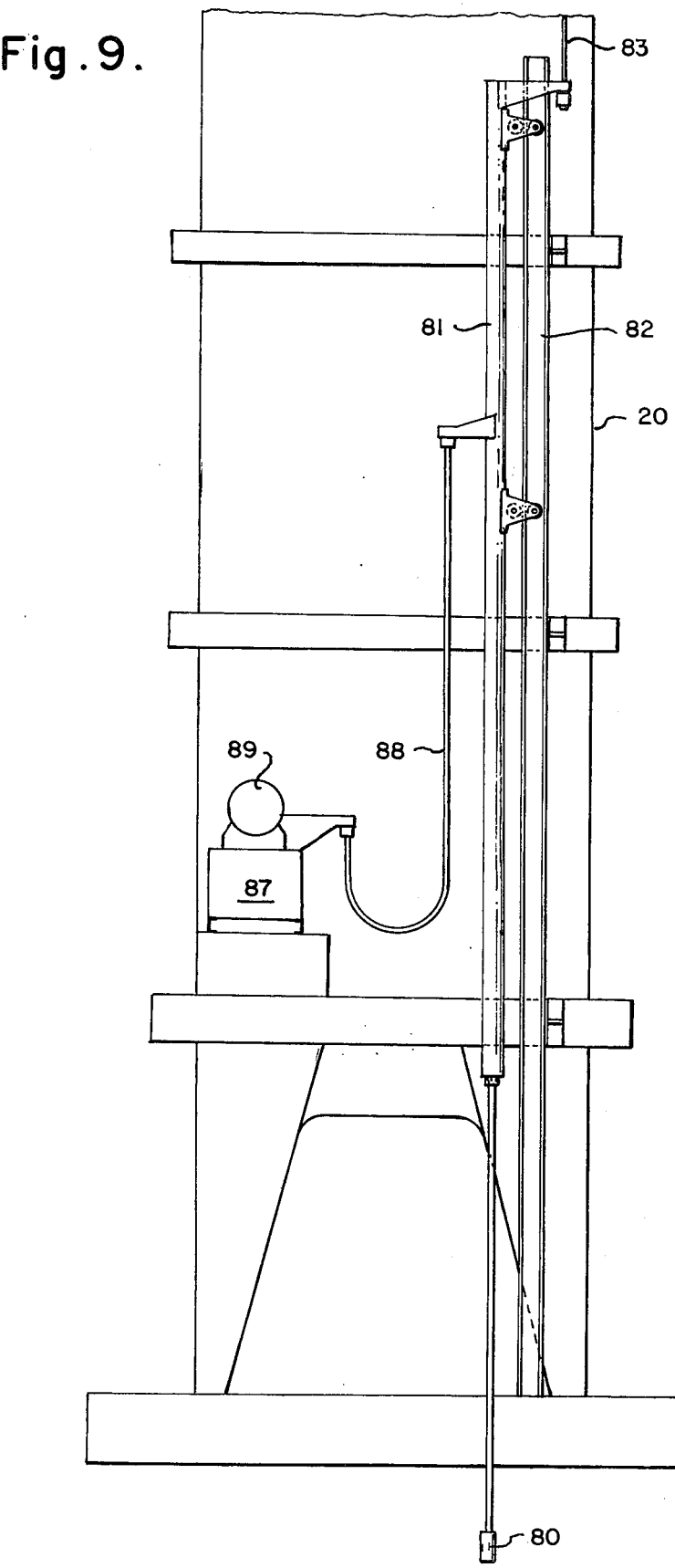
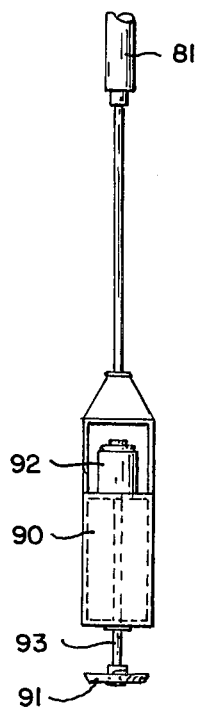

MOULD HANDLING, CLEANING AND PREPARATION SYSTEMS

This invention relates to mould handling, cleaning and preparation systems and more particularly to an apparatus suspended from a single trolley which is capable of accomplishing all of these functions without the need for separate devices for each.

The teeming of steel into moulds has characterized the manufacture of steel since its inception. Removing of the solidified ingots from moulds and the subsequent cleaning and preparation of the moulds for reuse has been a problem from the inception of the casting of molten steel into reusable moulds.

It is well known that moulds which are used for teeming ingots invariably have a build-up of scale on the inside wall. This scale, as is well known, causes the ingots to form scabs on the outside surface and also accelerates clustering of $Al_2O_3$ under the surface of the ingot which results in increased internal defects in the ingots. Both the excessive scab formation and the $Al_2O_3$ subsurface build-up are undesirable in such ingots and their elimination is highly desirable.

In the prior art various separate apparatus have been provided for removing ingots from moulds and thereafter cleaning and preparing the moulds. In general, these operations have been carried out in different plant areas using different pieces of equipment, each designed to perform a specific function without any conjoint or synergistic action.

We provide a uniquely new apparatus which is capable of performing all of these functions in a single location, thus reducing both the equipment and the space expense by a factor of several times.

We provide a bridge extending transversely across a work area and supported at its ends on a trackway above the work area, a first drive means on the bridge moving said bridge on the trackway, a trolley movable lengthwise of said bridge, second drive means for driving said trolley on the bridge, a main guide frame suspended vertically beneath the trolley, a main lift column vertically movable within said main guide frame, a pair of tongs pivoted on the main column opposite the trolley, tie link means between said tongs controlling relative movement of the tongs so that they move uniformly about the center line of the vertical column, a third drive means engaging said tongs to close the same, a secondary guide frame fixed to one side of the main guide frame, a secondary cleaning column vertically movable in said secondary guide, a drive shaft rotatable in said secondary column about a centerline of said secondary column, a cleaning head pivoted on said shaft about a line transverse to its axis, means on the secondary guide for rotating said shaft and head and means on said shaft for pivoting said head relative to the axis of the drive shaft cleaning means on said cleaning head for engaging the interior of a mould to be cleaned. A spray head guide rail fixed to a side of said main guide frame, a spray head movable vertically on said spray head guide rail, reservoir means on said main guide frame, and flexible connecting means between said reservoir and spray head for delivering mould conditioning fluid from the reservoir to the spray head. Preferably a pressure means such as a pump is provided at the reservoir for forcing the conditioning fluid from the reservoir through the spray head under pressure. The cleaning means on the cleaning head are preferably chains arranged to extend radially by centrifugal force to strike the mould interior and clean the surface thereof. Preferably the cleaning head is pivoted on each side of the drive shaft by means of hydraulic cylinders so as to shift the head through an angle of about 60 degrees so as to permit complete cleaning of the ingot corners and tops particularly in bottle top moulds and the like. The secondary guide column and the spray head guide rail are preferably on opposite sides of the main guide frame.

In the foregoing general description of our invention, we have set out certain objects, purposes and advantages of this invention. Other objects, purposes and advantages of this invention will be apparent from a consideration of the following description and the accompanying drawings in which:

FIG. 4 is an enlarged side elevational view of the main column and tongs with the accessory columns removed;

FIG. 5 is an enlarged and elevational view of the main column and tongs of FIG. 4;

FIG. 7 is an enlarged side elevational view of the secondary guide and cleaning column of this invention;

FIG. 8 is an end elevational view of the secondary guide and cleaning column of FIG. 7;

FIG. 9 is an enlarged end elevational view of the spray guide rail and spray assembly of this invention; and FIG. 10 is a fragmentary side elevational view of an optional reservoir and motorized slinger used in place of the spray head of FIG. 9.

Figure 1:
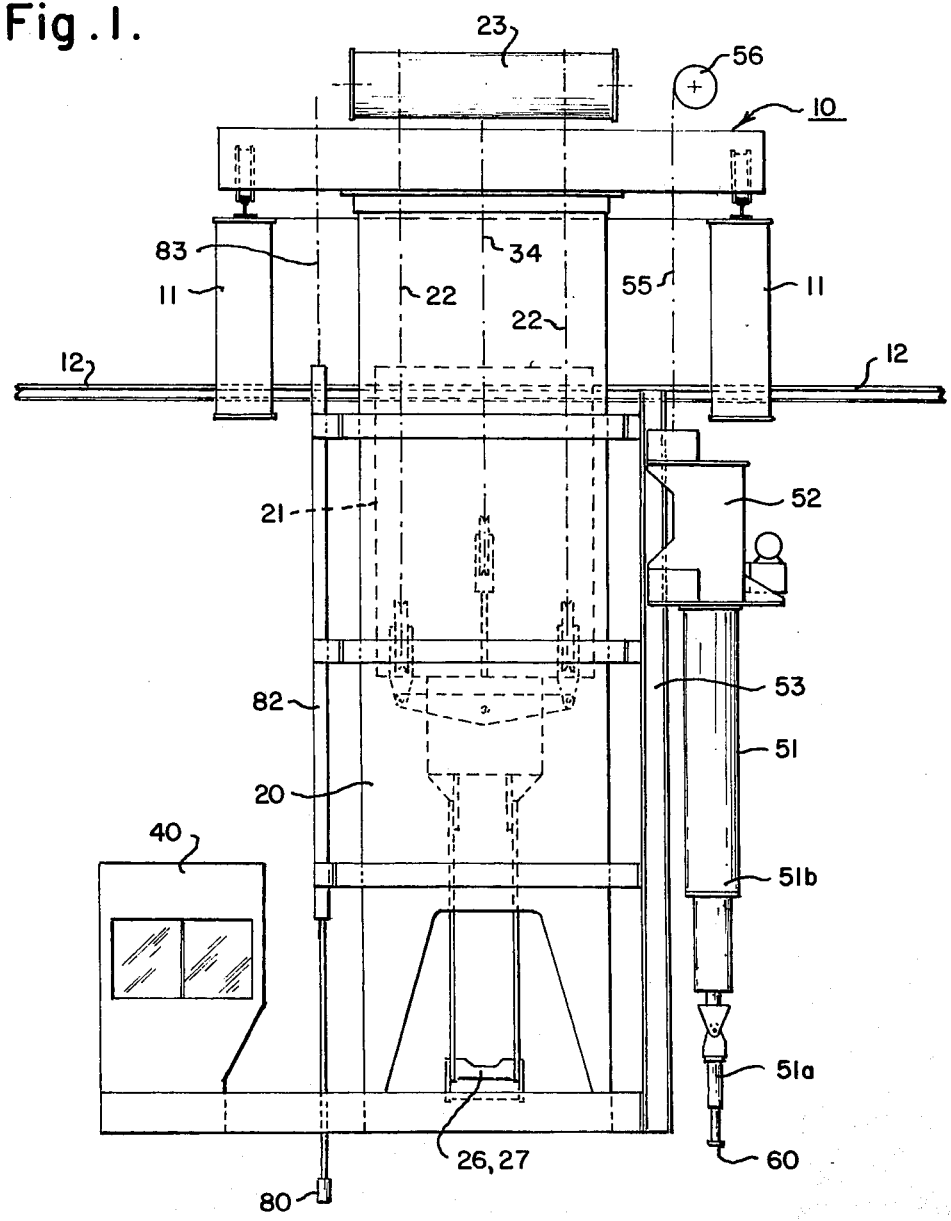
FIG. 1 is a front elevational view partly in section of an apparatus according to this invention.
Figure 2:
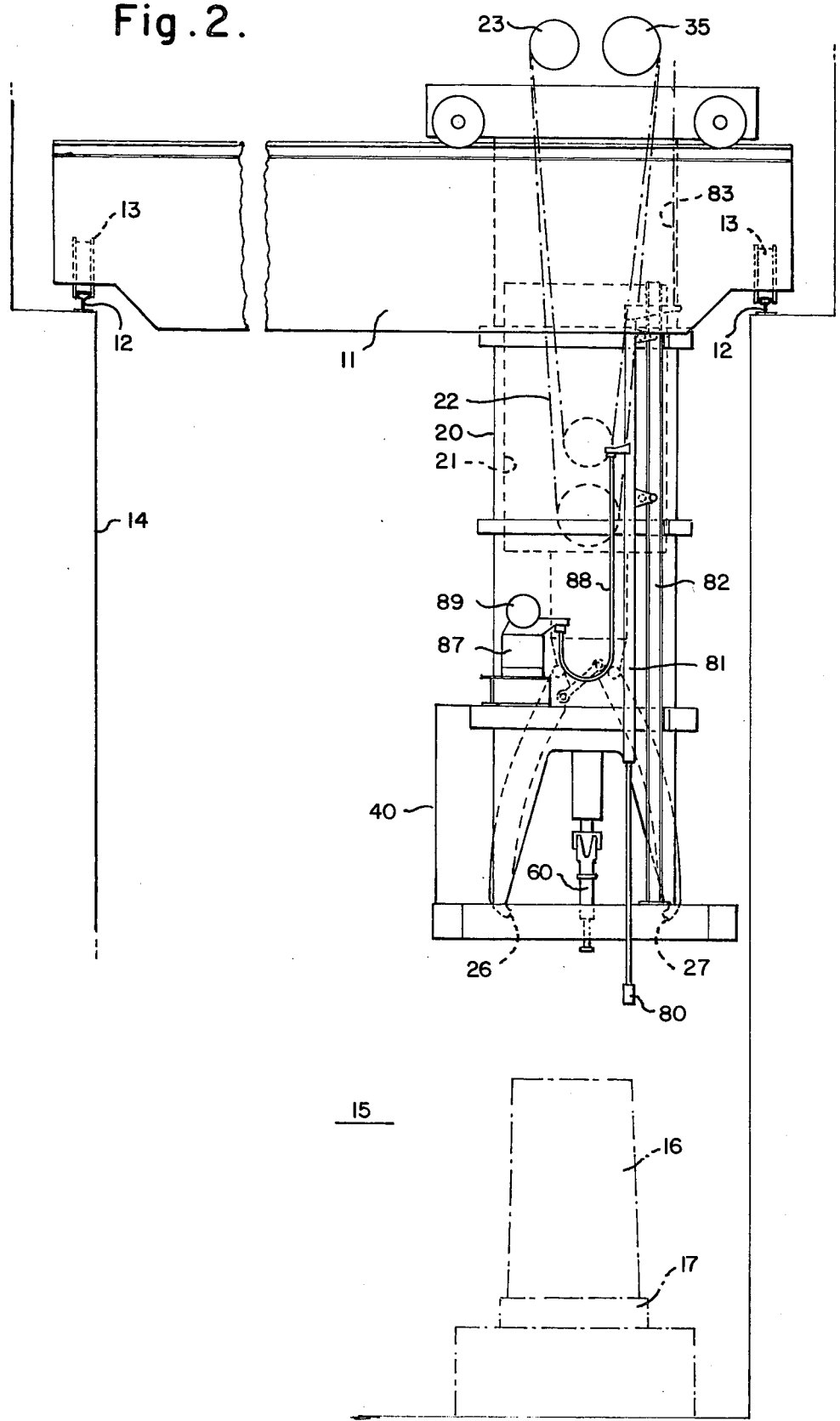
FIG. 2 is a side elevational view of the apparatus of FIG. 1.
Figure 3:
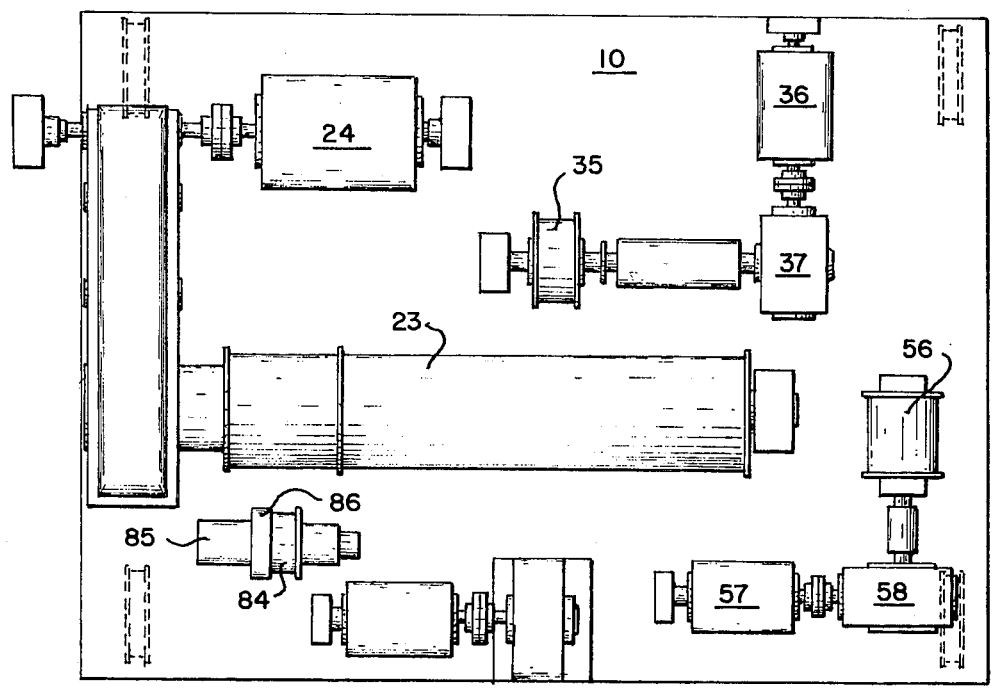
FIG. 3 is a top plan view of the trolley of FIGS. 1 and 2.
Figure 6:
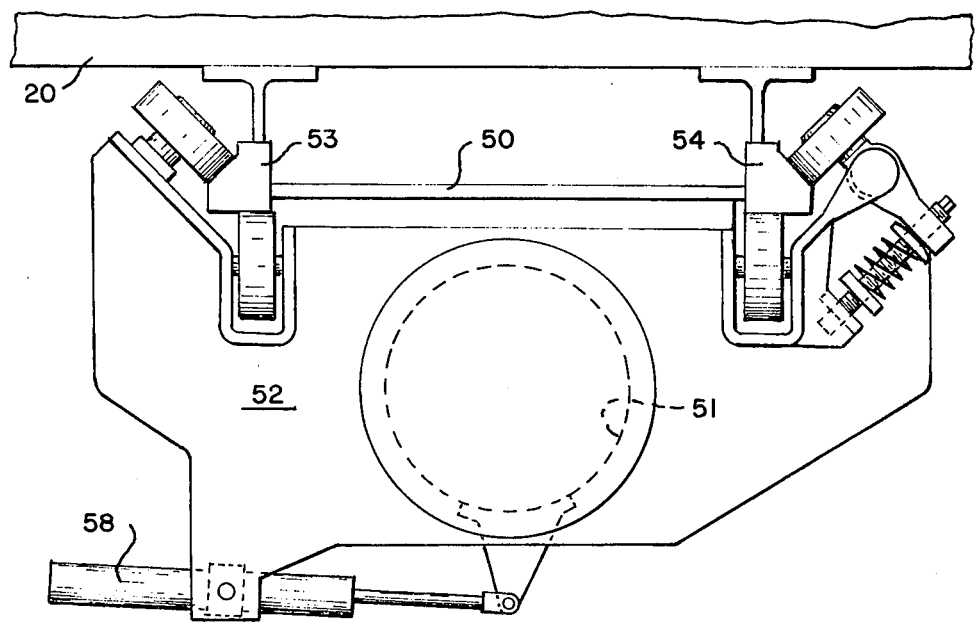
FIG. 6 is an enlarged top plan view of the secondary guide and the cleaning column.

Referring to the drawings we have illustrated a trolley 10 movable lengthwise of a movable bridge 11 which is in turn movable along rails 12 on wheels 13. Rails 12 are mounted on a building frame 14 alongside a mould stripping and work area 15. Suspended from trolley 10 is a main guide frame 20 having an inner lift column 21 vertically movable therein on cables 22 suspended from a main hoist drum 23 on the trolley driven by motor 24 through gearing 25 and passing around sheaves 21a and 21b on opposite ends of equalizer beam 21c. A pair of lift tongs 26–27 are pivoted at one end on the bottom end of lift column 21. The two other ends are moved toward or away from each other by a scissors linkage 28 operated by a vertical shaft or lift rod 29. The said one end of said lift tongs 26 and 27 are provided with lever members 30 and 31 respectively connected by a tie link 32 which causes the tongs to move uniformly and together about the center line of the lift column. This is important for the purpose of permitting an operator in cab 40 to precisely spot a mould 15 in place on a stool 17 or the like. The lift rod 29 is connected at its upper end to sheave assembly 33 around which is reeved rope or cable 34 from drum 35 driven by motor 36 through gear box 37.

A secondary guide 50 is fixed to one side of the main guide frame 20 and carries a mould cleaning column 51 on a wheeled carrier 52 adapted to run on guide rails 53-54 on each side of guide column 50. The carrier is connected to a cable 55 which is fixed on drum 56 on trolley 10. Drum 56 is driven by motor 57 through gear box 58 to raise and lower the cleaning column 51 into and out of a mould. The mould cleaning column 51 is mounted in carrier 52 to permit rotation about its axis by means of hydraulic cylinder 58 mounted on carrier 52. Column 51 is made up of two parts, a lower part 51a and an upper part 51b. A cleaning head 60 is journaled in the lower part 51a of column 51 for axial rotation and is rotated by a hydraulic motor 61 fixed in upper part 51b of column 51, through shaft 62 and U-joint 63. The lower end 51a of column 51 is pivoted to the upper part 51b by pivot pins 64 in clevis connections 65 to permit a relative angular movement of the lower end 51a relative to the upper end 51b of about 60 degrees by means of hydraulic cylinder 66. This in turn positions the cleaning head 60 angularly within a mould being cleaned. Chains 68 are attached at one end to head 60 so that on rotation of head 60 by motor 61, they fly out radially from the axis of head 60 and strike the mould interior to break away and remove accretions on the mould walls.

A spray head 80 is fixed on the end of spray column 81 which is in turn carried by a vertical rail 82 fixed to the main guide frame 20 on the side opposite the cleaning column 51. Spray column 81 is moved on rail 82 by means of cable 83 extending from drum 84 on trolley 10. The drum 84 is driven by motor 85 through gear box 86. A tank 87 for carrying mold treating solutions such as molasses is fixed on frame 20. A pump 89 and connecting line 88 from tank 87 to spray column 81 carries the pressurized mold treating composition to the spray head 80 for spraying on the mould interior by spray head 80 as the same is moved vertically within the mould.

In operation, the handling of moulds and stools is accomplished by using the main column 21 and tongs 26 and 27 to pick up stools and place them on a carriage and then place a mould on the stool. In the cleaning operation, a mould having an opening at the top is cleaned by moving the cleaning head on column 51 into the interior of the mould. The head is then rotated rapidly to cause the chains 68 to extend radially outwardly to strike the interior mould walls. The lower end 51a of column 51 is pivoted angularly within the mould to permit the chains to clean into top crevices in bottle top or like partially closed moulds.

When the mould is clean, the cleaning head is lifted vertically out of the mould and the spray head 80 is lowered into the interior of the mould and a mould coating sprayed onto the interior of the mould as the spray head is raised vertically therein.

In the embodiment illustrated in FIG. 10 a reservoir 90 is substituted for spray head 80 and a slinger 91 driven by motor 92 through shaft 93 receives the coating material from reservoir 90, and slings it radially against the interior of the sidewalls of the mould. The coating material can be delivered to the slinger by a variety of valved nozzles (not shown).

In the foregoing specification, we have set out certain preferred practices and embodiments of this invention, however the invention may be otherwise embodied within the scope of the following claims.

We claim:

1. A mould handlng, cleaning and preparation apparatus comprising a bridge extending transversely across a work area, wheels at each end of said bridge adapted to run on rails carried by a building framework alongside the work area, drive means for driving at least one wheel at each end of said bridge, a trolley on said bridge movable from end to end lengthwise of the bridge, wheels on said trolley, guide rails on said bridge receiving and guiding said trolley, drive means on the trolley for driving at least a part of said wheels on the trolley, a main guide frame extending vertically from said trolley, a main lift column movable vertically in said main guide frame, means on the trolley for vertically moving said lift column, a pair of opposing tongs pivoted on the lift column opposite the trolley, means on the trolley and lift column for opening and closing said opposing tongs, a secondary guide frame on one side of said main guide frame, a cleaning column vertically movable on said secondary guide, a drive shaft rotatable in said secondary column, drive means in the secondary column for rotating said drive shaft, a cleaning head pivotally attached to the cleaning column and drive means for rotation about the end of said column, cleaning means on said cleaning head for engaging the interior of a mould to be cleaned, a spray head guide rail fixed to a side of the main guide frame, a spray head movable vertically on said guide rail, reservoir means on the main guide frame for holding a liquid mould treating composition and flexible connecting means between said spray head and reservoir.

2. A mould handling, cleaning and preparation apparatus as claimed in claim 1, wherein the means for opening and closing said tongs includes a scissor link and a lift cable extending from the trolley to said scissor link to operate the same to close the tongs.

3. A mould handling, cleaning and preparation apparatus as claimed in claim 1 or 2 wherein tie link means is provided between the tongs for controlling their relative movement so that they move uniformly about the centerline of the main lift column.

4. A mould handling, cleaning and treating apparatus as claimed in claim 1 wherein the cleaning means are chains fixed at one end to the cleaning head and adapted to extend radially from said head by centrifugal force when said head is rotated.

5. A mould handling, cleaning and treating apparatus as claimed in claims 1 or 4 wherein the cleaning head is driven by a hydraulic motor in the cleaning column.

* * * * *